Oct. 7, 1947.  T. E. MEAD  2,428,496
WORK HOLDER
Filed Jan. 10, 1944
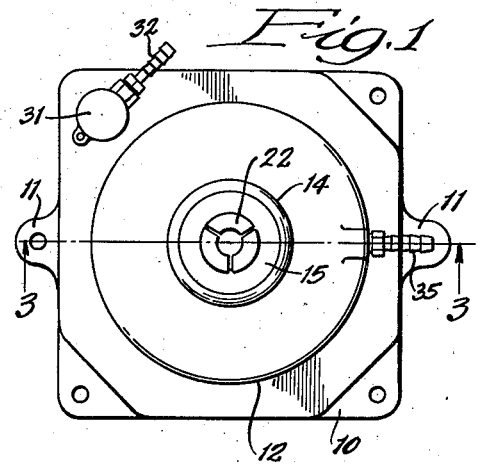
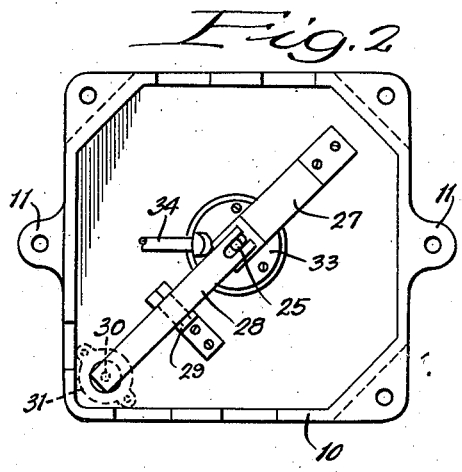
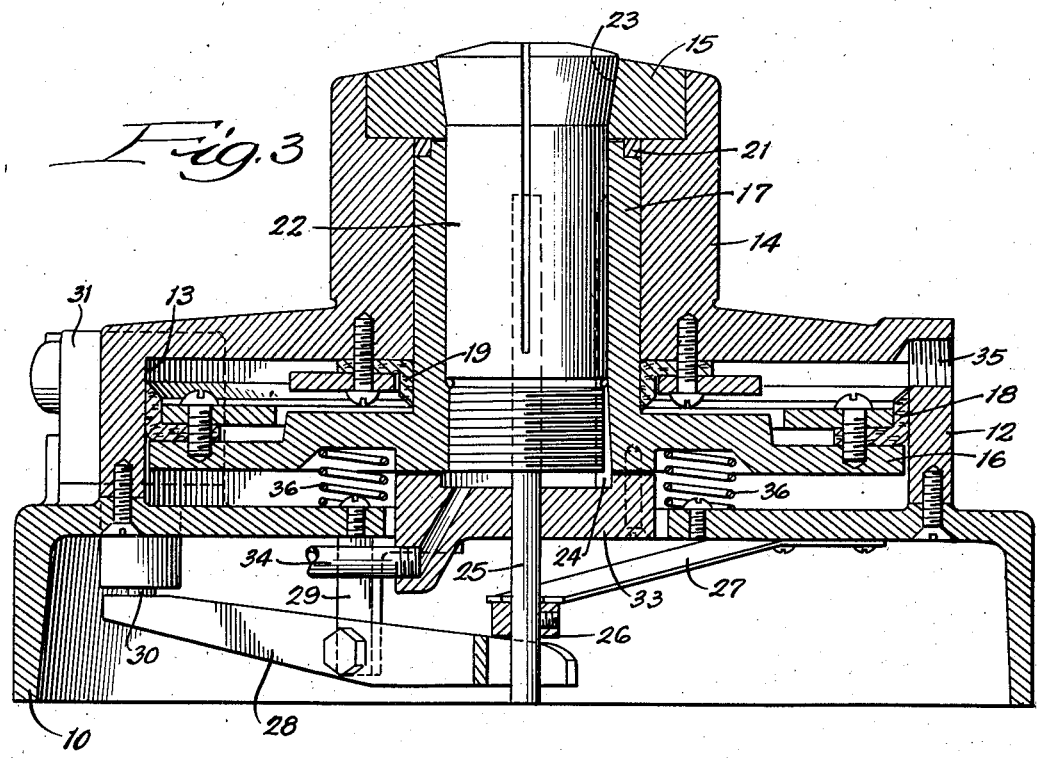
Inventor:
Theodore E. Mead,
By Dawson, Ooms and Booth,
Attorneys.

Patented Oct. 7, 1947

2,428,496

UNITED STATES PATENT OFFICE 2,428,496

WORK HOLDER

Theodore E. Mead, Wilmette, Ill., assignor to Mead Specialties Company, Inc., a corporation of Illinois Application January 10, 1944, Serial No. 517,640

10 Claims. (Cl. 279—4)

1

This invention relates to work holder and more particularly to apparatus for holding a work piece during a machining operation.

One of the objects of the invention is to provide a work holder which is very compact, of minimum height and made up of a minimum number of parts.

Another object of the invention is to provide a work holder which is operated by fluid pressure to clamp a work piece during a machining operation and to eject the work piece upon completion of the operation.

Still another object is to provide a work holder in which fluid is circulated through the clamping parts for cleaning or lubrication.

The above and other objects and advantages will be more readily apparent from the following description when read in connection with the accompanying drawing, in which—

Figure 1 is a top plan view of a work holder embodying the invention;

Figure 2 is a bottom plan view; and

Figure 3 is an enlarged central section on the line 3—3 of Figure 1.

The work holder as shown comprises a rectangular hollow base 10 adapted to be supported on the work table of a machine and which may be held in place thereon by screws or the like passing through lugs 11 on the base. Above the base a main body is mounted including an enlarged cylindrical portion 12 formed with a cylindrical bore 13 and having a tubular extension 14 of reduced diameter extending upwardly therefrom. The extension 14 carries at its upper end a clamping ring 15 having a conical central bore therein.

Within the bore 13 there is slidably mounted a piston 16 which is formed with a tubular neck 17 fitting slidably in the extension 14. The piston carries a packing 18 working against the inner surface of the bore 13. A similar packing 19 is connected to the body 12 to seal around the neck 17 of the piston. Preferably an oil ring or like packing 21 is provided on the neck 17 to prevent leakage of oil around the neck into the bore.

A clamping member 22 is secured in the neck and is formed with a plurality of jaws having conical outer surfaces indicated at 23 to cooperate with the clamping ring 15. As shown, the clamping member is screw threaded to the piston at the lower end of the neck and is held against accidental displacement by a key 24. The clamping member is hollow and is adapted to receive a work piece at its upper end which will be se-

2 curely clamped in place when the clamping member is moved down into the ring 15.

In order to limit movement of a work piece into the clamping member a stop rod 25 is provided extending loosely into the clamping member and adapted to rest at its lower end on the work table. The stop rod may be made of any desired length to permit movement of a work piece into the clamping member to the desired distance so that the vertical position of the work piece in the holder will be accurately determined.

The stop rod may also be utilized according to the invention to eject a completed work piece from the clamping member. For this purpose a collar 26 is fixed on the stop rod and is engaged by one end of a leaf spring 27 which is rigidly attached to the under surface of the base at its opposite end. The spring yieldingly holds the stop rod down against the work table and permits it to be moved up for ejecting the work piece from the clamping member.

The rod is moved up by a lever 28 pivoted intermediate its ends on a bracket 29 in the base and having a forked end straddling the stop rod below the collar 26. The opposite end of the lever 28 is engaged by the end of a piston rod 30 connected to a piston working in a cylinder 31. Fluid pressure may be supplied to the cylinder 31 above the piston through a connection 32. It will be noted that the cylinder 31 is mounted on the upper surface of the base so that the base can be made of minimum height and need not be large enough to accommodate the cylinder.

The clamping member and a work piece carried thereby may be kept clean and may be lubricated by providing a constant flow of lubricant through the clamping member around the work piece during operation. For this purpose the lower end of the neck 17 is closed by a cover 33 which is rigidly attached to the piston and which extends loosely through a central opening in the top of the base. Fluid such as a lubricant can be supplied through a conduit 34. Such fluid will flow upwardly through the clamping member around the work piece therein to cool and lubricate the parts and to flush any chips therefrom.

In operation when a work piece is inserted in the clamping member, fluid may be supplied to the bore 13 above the piston 16 through a connection 35. This forces the piston down camming the jaws of the clamping member inwardly into engagement with the work piece to hold it securely in place during a machining operation. On completion of the operation, pressure supplied to the bore is relieved permitting the piston to move upwardly under the influence of return springs 36. At the same time, pressure may be supplied to the cylinder 31 to raise the stop rod 25 thereby ejecting the completed work piece from the holder.

While one embodiment of the invention has been shown and described in detail herein, it is to be understood that this is illustrative only and is not to be taken as a definition of the scope of the invention, reference being had for this purpose to the appended claims.

I claim:

1. A work holder comprising a hollow base adapted to be supported on a work table, a body supported on the base and formed with a vertical bore, a tubular extension on the body coaxial with the bore, a piston in the bore having a hollow neck fitting in the extension, a tubular clamping member secured in the neck and adapted to clamp a work piece, a stop rod adapted to rest on the work table and extending into the clamping member to limit movement of a work piece thereinto, a fluid motor mounted above the base, and means in the base connecting the motor to the stop rod whereby when the motor is energized it will move the stop rod to eject a work piece from the clamping member.

2. A work holder comprising a hollow base adapted to be supported on a work table, a body supported on the base and formed with a vertical bore, a tubular extension on the body coaxial with the bore, a piston in the bore having a hollow neck fitting in the extension, a tubular clamping member secured in the neck and adapted to clamp a work piece, a stop rod adapted to rest on the work table and extending into the clamping member to limit movement of a work piece thereinto, a cylinder secured to the top of the base, a piston in the cylinder having a piston rod projecting into the base, and a lever in the base connecting the stop rod and piston rod whereby movement of the last-named piston will move the stop rod to eject a work piece from the clamping member.

3. A work holder comprising a hollow base adapted to be supported on a work table, a body supported on the base and formed with a vertical bore, a tubular extension on the body coaxial with the bore, a piston in the bore having a hollow neck fitting in the extension, a tubular clamping member secured in the neck and adapted to clamp a work piece, a stop rod adapted to rest on the work table and extending into the clamping member to limit movement of a work piece thereinto, a collar rigidly connected to the stop rod, a leaf spring secured to the base and engaging the collar to urge the stop rod against the work table, a lever pivoted in the base engaging the collar at one end, and a fluid motor on the base engaging and moving the other end of the lever to move the stop rod to eject a work piece from the clamping member.

4. A work holder comprising a body formed with a bore and having a reduced tubular extension, a piston fitting in the bore having a hollow neck fitting in the extension, a clamping member secured in the neck having movable jaws to hold a work piece, and means to supply lubricant under pressure through said piston to the interior of the neck to flow out past the clamping member and work piece.

5. A work holder comprising a body formed with a vertical bore and having a reduced tubular extension extending vertically above the bore, a piston fitting in the bore having a hollow neck fitting in the extension, sealing means sealing the neck and extension against the passage of fluid therebetween, a clamping member secured in the neck having movable jaws to clamp a work piece, the lower end of the neck being closed, and means to supply fluid under pressure through said piston to the lower end of the neck to flow out past the clamping member.

6. A work holder comprising a body formed with a bore and having a reduced tubular extension, a piston fitting in the bore having a hollow neck fitting in the extension, a tubular clamping member secured in the neck and adapted to clamp a work piece when the piston is moved, a stop rod extending into the clamping member to limit movement of a work piece thereinto, means to move the stop rod to eject a work piece from the clamping member, a closure for the lower end of the neck through which the stop rod slidably projects, and means to supply fluid to the interior of the neck to flow out past the clamping member.

7. A work holder comprising a hollow base adapted to be supported on a work table, a body supported on the base and formed with a vertical bore, a tubular extension on the body coaxial with the bore, a piston in the bore, a tubular clamping member secured to said piston and having an upper end portion adapted to engage a work piece, the interior of said clamping member communicating with the space below the piston, and spring means below said piston and normally urging said piston toward its upper position.

8. A work holder comprising a body formed with a bore having a reduced tubular extension, a piston fitting in the bore, a hollow clamping member in said tubular extension and secured to said piston, said clamping member extending into said tubular extension and adapted to clamp work therein when the piston is moved downwardly in the bore, means to admit fluid under pressure to the bore above the piston to move it downwardly, said hollow clamping member providing an opening communicating from the top portion of the member to the space below said piston, and resilient means urging the piston upwardly to move it to unclamping position when the pressure above the piston is relieved.

9. A work holder comprising a body formed with a bore and having a reduced tubular extension, a piston fitting in the bore having a hollow neck fitting in the extension, a tubular clamping member in the neck secured to the piston and adapted to clamp a work piece when the piston is moved downwardly in the bore, said clamping member providing free communication between the area above the clamping member and the space below the piston, means to admit fluid under pressure to the bore above the piston to move it downwardly, and a series of coil springs beneath the piston urging it upwardly to move it to unclamping position when pressure above the piston is relieved.

10. A work holder comprising a hollow base and adapted to be supported on a work table, a body supported on the base and formed with a vertical bore, a tubular extension on the body coaxial with the bore, a piston in the bore, a tubular clamping member secured to the piston and extending into the tubular extension and adapted to clamp a work piece upon downward movement of said piston, means to admit fluid under pressure to the bore above the piston to move it downwardly, said tubular clamping member being in open communication with said hollow base, and resilient means urging the piston upwardly to move it to unclamping position when the pressure above the piston is relieved.

THEODORE E. MEAD.

REFERENCES CITED

The following references are of record in the file of this patent:

UNITED STATES PATENTS

| Number | Name | Date |
|---|---|---|
| 1,295,994 | Lavoie | Mar. 4, 1919 |
| 926,761 | Oliver | July 6, 1909 |
| 409,674 | Fairfield | Aug. 27, 1889 |
| 1,085,146 | McClellan | Jan. 27, 1914 |
| 1,786,689 | White | Dec. 30, 1930 |
| 2,396,521 | Mead | Mar. 12, 1946 |